(12) United States Patent
Sawatari et al.

(10) Patent No.: US 6,868,736 B2
(45) Date of Patent: Mar. 22, 2005

(54) ULTRA-MINIATURE OPTICAL PRESSURE SENSING SYSTEM

(75) Inventors: Takeo Sawatari, Walled Lake, MI (US); Alex Klooster, Ann Arbor, MI (US); Dean M. Aslam, Okemos, MI (US); Yuping Lin, West Bloomfield, MI (US); James Marks, Saline, MI (US)

(73) Assignee: Sentec Corporation, Walled Lake, MI (US)

( * ) Notice: Subject to any disclaimer, the term of this patent is extended or adjusted under 35 U.S.C. 154(b) by 26 days.

(21) Appl. No.: 10/371,871

(22) Filed: Feb. 21, 2003

(65) Prior Publication Data

US 2003/0159518 A1 Aug. 28, 2003

Related U.S. Application Data

(60) Provisional application No. 60/358,807, filed on Feb. 22, 2002.

(51) Int. Cl.[7] .............................. G01L 1/24; F16C 11/00
(52) U.S. Cl. ........................................ 73/800; 403/125
(58) Field of Search .................... 73/705, 800; 356/477

(56) References Cited

U.S. PATENT DOCUMENTS

| | | | | |
|---|---|---|---|---|
| 2,131,738 A | * | 10/1938 | Hoyt | ............................ 73/384 |
| 4,493,212 A | * | 1/1985 | Nelson | ......................... 73/800 |
| 5,291,014 A | * | 3/1994 | Brede et al. | ............ 250/227.21 |

* cited by examiner

Primary Examiner—Edward Lefkowitz
Assistant Examiner—Takisha Miller
(74) Attorney, Agent, or Firm—Kevin G. Mierzwa

(57) ABSTRACT

The fiber optic pressure sensing system includes a sensor housing formed using MEMS processing. The sensor housing has ribs and grooves in both horizontal and vertical directions relative to the surface to allow the membrane to flex in a consistent manner. The flexing of the membrane allows the pedestal to be repeatedly positioned in response to pressure acting on the extension of the sensor head and membrane.

10 Claims, 11 Drawing Sheets

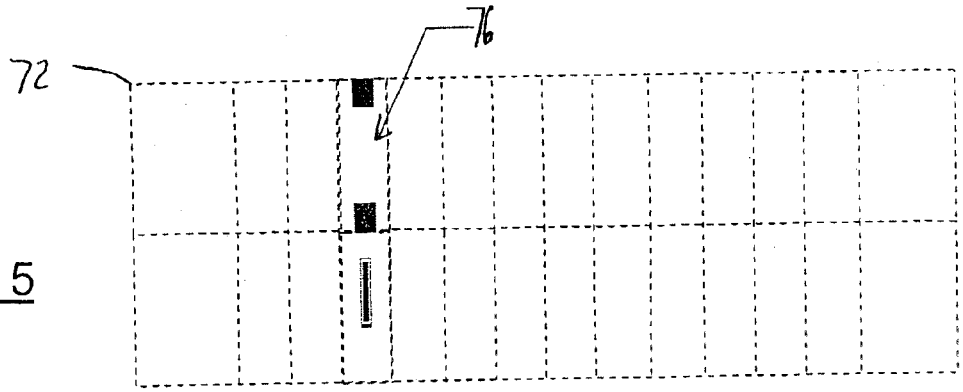
FIG. 5
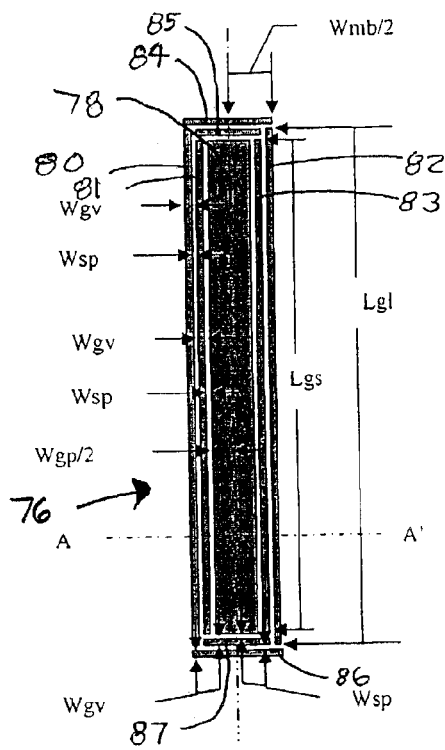
FIG. 6
FIG. 7

ULTRA-MINIATURE OPTICAL PRESSURE SENSING SYSTEM

RELATED APPLICATION

The present invention claims priority to provisional application No. 60/358,807 filed on Feb. 22, 2002.

FEDERAL RESEARCH STATEMENT

This invention was made with Government support under Grant Number 5R44HL62038 awarded by the National Institute of Health.

TECHNICAL FIELD

The present invention relates generally to optical pressure sensors and, more specifically, to an ultra-miniature fiber optic pressure sensor embedded in an angioplasty guidewire.

BACKGROUND

Each year in the United States, five million patients get initial diagnosis of a heart attack, and nearly one million patients undergo coronary angioplasty, or other interventional procedures, to open or restore flow through stenosed vessels. Angiography is the standard method for assessing lesion severity, but it only provides an anatomic view of the lumen of the vessel, often in only one plane. Clinical benefits, as well as other benefits, would result if a real-time assessment of the functional severity of the lesion and its effect on blood flow were possible. A current method for attempting to acquire this information is the Doppler guidewire via which flow (or flow velocity) can be measured at the lesion. For reliable measurements, a catheter must be accurately positioned and must be stable during the entire data collection interval. This is difficult to do and, consequently, this method is not widely used. In addition, the necessary equipment is expensive and requires an elaborate training program for proficient use. A method involving direct measurement of pressure, rather than velocity, will have distinct advantages. Direct pressure measurements are easier to interpret, more familiar to medical personnel, require less expensive recording instruments and signal processing devices, and the position of the catheter is less critical. In addition, velocity measurements assess flow only through the lesion, while pressure measurements also assess the effects of collateral flow from other sources. This collateral flow can mediate the effect of the lesion in some cases. A direct-reading pressure catheter system can be used during angioplasty to monitor the progress and the immediate effects of the procedure on pressure distal to the lesion.

During angioplasty procedures, it is useful to be able to measure pressure distal to the lesions before, during, and after dilatation by the balloon. A procedure currently being investigated is the measurement of distal pressure during maximal vasodilatation. This is referred to as "functional flow reserve" and is a measure of the effect of the pressure drop across the lesion at maximal flow. This is currently measured through the lumen of the angioplasty catheter, but has limited fidelity, and can itself add to the severity of the lesion and the measured pressure drop. A narrow pressure sensor for direct pressure measurements was introduced in the U.S. market in February 1999, by RADI of Sweden called PressureWire™. The PressureWire™ sensor has a 360 micron diameter. However, there are several limitations with this sensor: (1) cost effectiveness, (2) mechanical characteristics, and (3) pressure measurement stability during angioplasty procedures. The current invention is related to a disposable sensor that reduces these limitations.

With the advent of the RADI PressureWire™, many studies have been conducted to determine the specific usefulness of such a device for diagnosis and an assessment of the effectiveness of the treatment during angioplasty. The high interest in such a device is demonstrated with over 20 papers presented about the RADI PressureWire™ at the ACC meeting held March, 2000 in Anaheim Calif. A new index, the Fractional Flow Reserve (FFR), defined as FFR= Pa/Pd (Pa=aortic pressure and Pd=distal coronary pressure), can be obtained by such a device and is now considered to be an accurate, quantitative and cost effective method for diagnosis and assessment. In particular, the method is effective for accurately determining the clinical significance of moderate stenoses. These are difficult to determine with current angiography procedures.

Presently the most common mass-produced disposable pressure sensors in the medical industry are silicon electronic devices with a typical size of several millimeters in diameter for the sensing area, usually used together with fluid-filled catheters as external pressure transducers. They are based on the piezoresistive or capacitive properties of silicon crystal and need complex circuitry for signal processing, drift compensation, and noise reduction before the information is made available to the medical personnel. These devices have an inherently high hysteresis and significant short-term creep (i.e., within a few hours) and thus need frequent re-calibration. They cannot easily perform static DC measurements. They also need to have a certain minimum size for the pressure-sensing mechanism to generate an adequate signal, so it is difficult to reduce the size down to the sub-millimeter region at a reasonable cost. The RADI PressureWire™ overcomes the size problem. However, it is an electronic sensor and the inherent problems described above remain, including a drift problem. In addition, the narrow (high impedance) cable must be adequately shielded to reduce RF interference. The desired feel (or stiffness) of the guidewire is therefore very difficult to achieve.

Fiber-optic sensors for direct pressure measurements are generally known in the art. Fiber-optic sensors are of a relatively simple design, have an inherently smaller potential size, and offer other advantages. A fiber-optic sensor is safe, involving no electrical connection to the body; because the primary signal is optical it is not subject to electrical interference, is very small and flexible, and can be included in catheters for multiple sensing. In addition, fiber-optic devices lend themselves well to existing mass production techniques.

U.S. Pat. No. 5,987,995 to the present assignee describes a fiber-optic pressure catheter that is suited to be low-cost and disposable. The sensor of the '995 patent includes a ribbon reflector, in contact with a polyurethane window, as the key sensing element that translates mechanical deformation, due to pressure, to an optical intensity variation of a signal beam. For some applications, the sensor of the '995 patent is undesirably large.

It would therefore be desirable to provide a pressure sensing system that is capable of providing a sufficient amount of deflection for the membrane in order to improve the accuracy of the device, increase the sterility of the system, and provide a means for adjusting the sensitivity so that consistent pressure readings are obtained if the sensor is disconnected from the light source and monitoring system.

SUMMARY

The present invention provides an improved pressure monitoring system particularly suited for use during angioplasty procedures.

In one aspect of the present invention, an improved fiber-optic pressure includes an optical fiber and a sensor head that is coupled to the optical fiber. The sensor head has a first portion having a membrane and a second portion. The membrane comprises a substrate having a rectangular center portion having a pair of first sides having a first length and a pair of second sides having a second length. The membrane has a plurality of parallel grooves and ribs formed around the center portion to allow the membrane to deflect inward.

In one constructed embodiment the grooves and ribs are formed parallel to the first sides and second sides. Two continuous rectangular grooves parallel to the center portion were used. The grooves have the ribs therebetween. The ribs are preferably discontinuous to facilitate flexing of the membrane.

In a further aspect of the invention, a method of forming a pressures sensor comprises forming a top portion of a sensor housing; on a first substrate, etching a rectangular portion with a plurality of grooves defining a plurality of ribs around the center portion, and on a second side of the substrate etching to form a pedestal extending from the center portion.

In yet another embodiment of the invention, an optical connecting system includes a housing having a central axis, a first optical fiber coupled to the housing having a first end and a second optical fiber coupled to the housing along the central axis having a second end. A lens and a lens scanning device movably coupled to the lens is also included within the housing. The lens is disposed on the central axis of the housing. The lens scanning device moves the lens relative to the housing to direct light from the first end to the second end.

In yet another aspect of the invention a connector for connecting an optical fiber to the housing includes a collet having a flange portion and a hollow tube portion for receiving the guidewire, said tube portion having a taper. A cap portion having a channel therethrough has a second taper portion that corresponds to the first taper portion. A spring is used to couple the collet to the cap.

Advantages of the invention include that the sensor measures blood pressures in the range of 0 to 300 mmHg with long-term stability and high fidelity. Also, the pressure sensor, imbedded in the guidewire, is stable for time periods compatible with prolonged guidewire implantation (up to 72 hours) although only 20 minutes is normally required in angioplasty use. Further pressure readings are independent of temperature over a range of at least 20° C. to 50° C. In addition to its functional properties, the pressure-sensor imbedded in a guidewire will be designed to be disposable and will, therefore, be available at a reasonable cost.

Other advantages of the present invention are also apparent. By providing grooves and ribs in the membrane, the present invention allows the device to be fabricated using MEMS processing techniques while allowing a substantial amount of pedestal deflection.

Yet another advantage of the invention is that repeatability is enhanced by the improved optical connecting system. That is, because a pressure sensor may be required to be decoupled during angioplasty, when the pressure sensor is reconnected, the optical connecting system adjusts the directional light between the two optical fiber ends so that consistent readings may be generated.

The sterility of the system is also improved by providing an improved connector for connecting the optical fiber to the housing. The connectors are relatively inexpensive and provide a tight seal for mounting the optical fiber to the housing.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 5 is a top view of the chip having a mask pattern thereon.

FIG. 6 is an enlarged view of the mask pattern of both of the cell types of FIGS. 4 and 5.

FIG. 7 is an enlarged mask of the first cell of FIG. 6.

DETAILED DESCRIPTION OF THE PREFERRED EMBODIMENT

Figure 1:
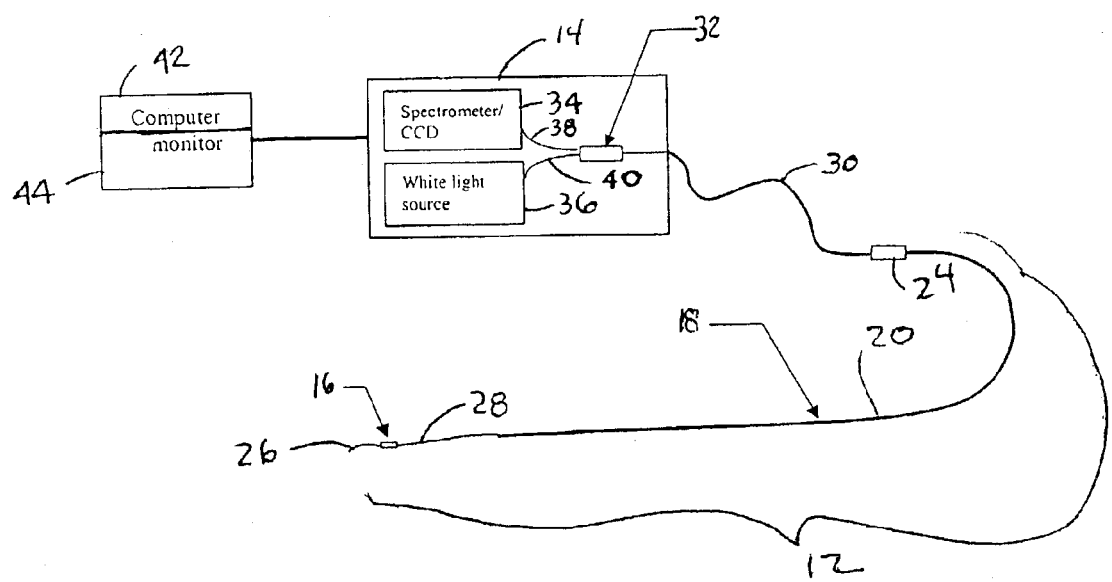
FIG. 1 is a block diagrammatic view of the optical pressure sensing system according to the present invention.

In the following figures the same reference numerals will be used to illustrate the same components.

Although the invention is illustrated in the context of a fiber-optic sensor suitable for use in the human body, it will be appreciated that this invention may be used with other applications requiring pressure sensing.

Referring now to FIG. 1, a pressure sensing system 10 has a sensor unit 12 and a light transmitting and receiving unit 14. Sensor unit 12 extends to the location in which the pressure is to be measured. Sensor unit 12 provides a spectral modulation of the light to light transmitting and receiving unit 14. Light transmitting and receiving unit 14 converts the modulation into the spectral fringe pattern and also converts into a pressure reading with a microprocessor (or sends the digitized signal of the fringe pattern to a computer to convert a pressure reading).

Sensor unit 12 comprises a sensor head 16, an optical fiber 18 within a guidewire 20, and a connecting system 24. The sensor unit 12 further includes a coil tip 26 and a spring coil 28 that are typically associated with an angioplasty device. The sensor head 16 may, for example, be placed in a human artery to measure blood pressure or placed within the brain to measure fluid pressure. Optical fiber 18 is connected between the connector 24 and the sensor head 16.

Light transmitting and receiving unit 14 is connected through an optical fiber to the adaptive fiber connector 24. The light transmitting and receiving unit 14 includes an optical coupler 32, a spectrometer/CCD device 34, a white light source 36, an optical fiber 38, and a second optical fiber 40. Optical fibers 38 and 40 are used to couple the spectrometer/CCD 34 and the white light source 36, respectively, to fiber coupler 32. The coupler 32 is also used as a beam splitter to send light returned by the sensor head 16 to spectrometer 34.

Spectrometer 34 is used to analyze the light received from the sensor head 16. Spectrometer 34 may divide the light into its wavelength components. Spectrometer 34 preferably uses a linear detector such as a series of charge coupling devices (CCD). Spectrometer 34 converts the detected light signal from the sensor 16 into a desirable output format such as digital signals.

Light source 36 is preferably a wide band light source such as a white light source. One example of a desirable white light source is a tungsten-halogen source.

Light transmitting and receiving unit 14 may also have a computer 42 associated therewith. Computer 42 is used to perform mathematical calculations with the digitized output of spectrometer 34 to determine the pressure and various calibrations and adjustments as will be further described below. A monitor 44 may be used to display the pressure as calculated by the computer 42. The spectrometer 34 and optical coupler 32 may be contained on a compact computer board, which is inserted into computer 42. Such a light digitizer is manufactured by Ocean Optics.

One constructed embodiment of the invention includes guidewire 20 being formed of a hypo-allergenic tube of approximately five feet long having a 300 micron outer diameter. Spring coil 26 has the same outer diameter as the guidewire and is about eight to ten inches long. The sensor head 16 may be formed approximately two to three millimeters long. The coil tip may be tapered in diameter and be approximately one inch long. The coil tip is preferably made of platinum. The optical fiber 18 within the guidewire 20 with cladding and protective cover of polyimide has approximately a 90 micron outer diameter. The core of the optical fiber is a multi-mode optical fiber having a core diameter of approximately 60 microns.

Figure 2:
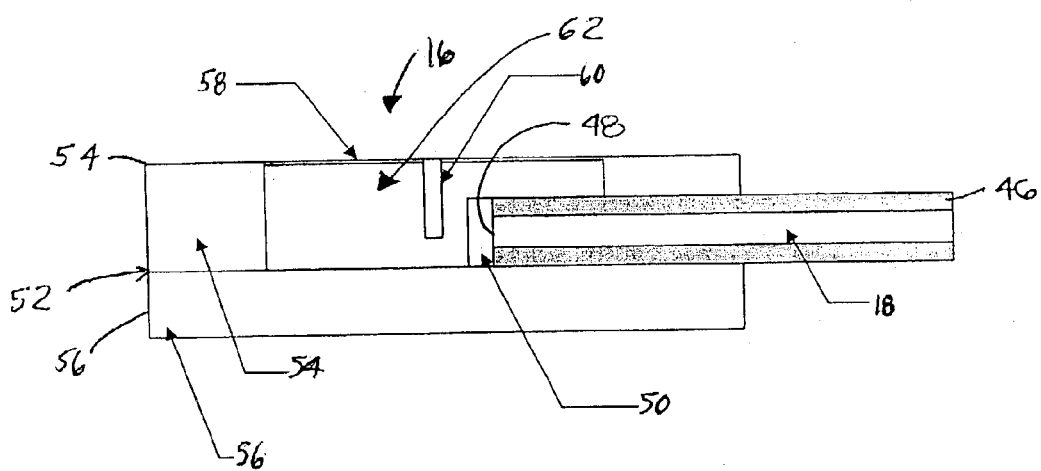
FIG. 2 is a simplified schematic view of a sensor head coupled to an optical fiber according to the present invention.

Referring now to FIG. 2, one embodiment of sensor head 60 is illustrated coupled to optical fiber 18 that has a cladding and polyimide casing 46. Optical fiber 18 has a first end 48 that is polished smooth to be optically flat. The end 48 preferably has a coating 50 disposed thereon. The coating 50 is preferably formed of titanium dioxide ($TiO_2$) or zinc sulfide (ZnS). Coating 50 may be about 0.7 to 3 microns but is approximately 2 microns thick.

Sensor head 16 has a housing 52. Housing 52 has a top portion 54 and a bottom portion 56. The top portion 54 includes a membrane 58, a pedestal 60 and a cavity 62. The optical fiber is positioned between the top portion 54 and the bottom portion 56. Preferably, the top portion 54 has membrane 58, pedestal 60 and cavity 62 integrally formed therewith. The housing 52 may be formed of a silicon material with a metallic material coating such as titanium grade 5. The system works in a similar manner to that described in U.S. Pat. No. 5,987,995, which is incorporated by reference herein. A portion of light from the light source 36 never leaves optical fiber 18. That is, the light reflects from end 48 and travels back through the optical fiber 18. To increase and generate a desired pattern of reflectance of the end 48, a portion of the light passes through the coating 50 and reflects from the end thereof: The coating 50 works as an Etalon so that the spectrum of the reflected light from the two surfaces is "spectrally" modulated (forming white light fringes). Some light leaves the coating 50 and bounces from the pedestal 60 back into the coating 50 and through the fiber core 18. This bounced light is also spectrally modulated in such a way that the fringes are a complement of these of the reflected light by the coating 50. As the pressure increases, the amount of the pedestal 60 in front of the optical fiber 18 varies. The amount varies from almost no pedestal in front of the reflective end to partially in front of the optical fiber 18. Thus, it is the deflection of the membrane 58 that controls the amount of movement of the pedestal 60. Thus, it is desirable to provide a suitable amount of movement of the pedestal 60. The light returning from the sensor head consists of a superposition of two fringes: one from the coating 50 and the other from the pedestal 60. The pressure is determined from a contrast of the superimposed fringes as is described in U.S. Pat. No. 5,987,995. It is to be noted that with this system the pressure is not directly determined by the amount of light reflected by the pedestal but is obtained as the contrast change of the superimposed fringes. Unlike the light variation measurements such as these taught in U.S. Pat. No. 5,018,529, this method of the measurement is a ratio measurement that makes the system robust against mechanical (fiber bending) and temperature fluctuations.

Figure 3:
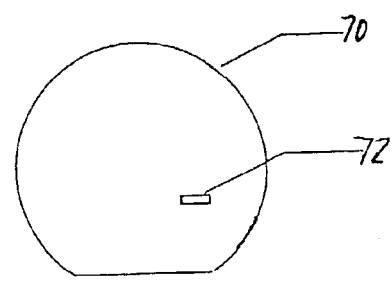
FIG. 3 is a top view of a wafer used to form the present invention.

Referring now to FIG. 3, the way in which the top of the sensor housing 54 and the bottom of the sensor housing 56 are made is described. In FIG. 3, a wafer 70 is illustrated having a chip 72 that is etched to form the present invention.

Figure 4:
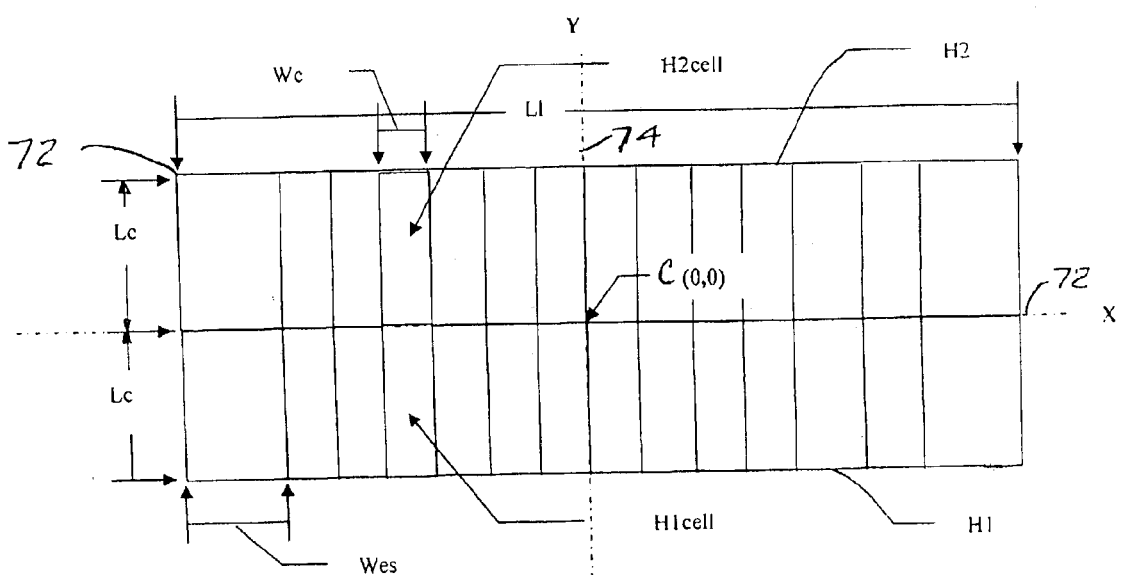
FIG. 4 is a top view of a chip having various cells used in forming the housing of the present invention.

Referring now to FIG. 4, chip 72 is illustrated in further detail. The chip is divided into a number of cells H1 and H2. H1 ultimately becomes the top portion 54 of the sensor housing and H2 becomes the bottom portion of sensor housing 56.

In one constructed embodiment, the length of chip 72, L1 was 16 millimeters, the length of each cell, Lc is 3 millimeters, the width of each cell, Wc is 1000 microns, and the width of the end portions, Wes is approximately 2 millimeters. The system is illustrated with respect to a coordinate system having an origin C at 0, 0. Thus, an X axis 72 and a Y axis 74 are illustrated.

Referring now to FIG. 5, a first mask 76 is provided. One mask for one H1 cell and one H2 cell is illustrated. The mask is repeated on each of the cells. The shaded areas illustrate the areas to be etched. The wafer from which the process is started is preferably about four or six inches in diameter and about 140 microns thick. Mask 1 is a lithographic mask that is applied to the surface except at the masked portions. Thus, when etching is performed, the illustrated shaded area will be etched.

Referring now to FIGS. 6 and 7, mask 1 has various dimensions.

Ltn=530
Wtn=200
Lup=700
Lmb=1200
Lfs=1100
Wmb=205
Wmb/2=205/2=102.5
Wgv=25
Wsp=4
Lgl=Lmb−2*(Wgv+Wsp)=1200−2*(25+5)=1140
Lgs=Lgl−2*(Wgv+Wsp)=1140−2*(25+5)=1080
Wgp=85

As can be seen, the mask 76 has various portions that correspond to the grooves in the surface. That is, a top view of the device after etching looks like FIG. 7 so the grooves and mask portions will be described together. Mask 1 has a center portion 78, two vertical portions 80 and 81 on the left side of the center portion 78, and two vertical portions 82 and 83 on the right side of the center portion 78. It should be noted that right and left are described with respect to FIG. 7. That is, vertical portions 80–83 are parallel to the longitudinal sides of the center portion 78. Mask 1 further includes horizontal portions 84, 85, 86, and 87. Horizontal portions 84 extend laterally and are parallel with the top and bottom sides of the center portion 78. Thus, the grooves formed by the vertical and horizontal portions 80–87 include discontinuous outer grooves 80, 82, 84, and 86 that are longer in size than their respective corresponding inner grooves 81, 83, 85, and 87. The lengths of the grooves formed by the masked portions 81 and 83 are preferably as long as the center portion 78. The grooves formed by the horizontal portions 85 and 87 are as long as the center portion, two ribs and the width of the grooves 81 and 83. The length of the grooves formed by the masked portions 80 and 82 are preferably as long as the longitudinal walls of the center portion 78 plus the width of two ribs and the width of the grooves 85 and 87. The length of the grooves formed by the portions 84 and 86 are preferably as long as the lateral width of the center portion 78, four ribs formed between the horizontal walls 81, 82, and 83 and the width of the grooves formed by the portions 81, 82, and 83.

The mask 76 and grooves are preferably elongated and rectangular in shape. Dimensions of the grooves and thus the widths of the ribs formed by the system are described below:

Ltn=530
Wtn=200
Lup=700
Lmb=1200
Lfs=1100
Wmb=205
Wmb/2=205/2=102.5
Wgv=25
Wsp=4
Lgl=Lmb−2*(Wgv+Wsp)=1200−2*(25+5)=1140
Lgs=Lgl−2*(Wgv+Wsp)=1140−2*(25+5)=1080
Wgp=85

Figure 8:
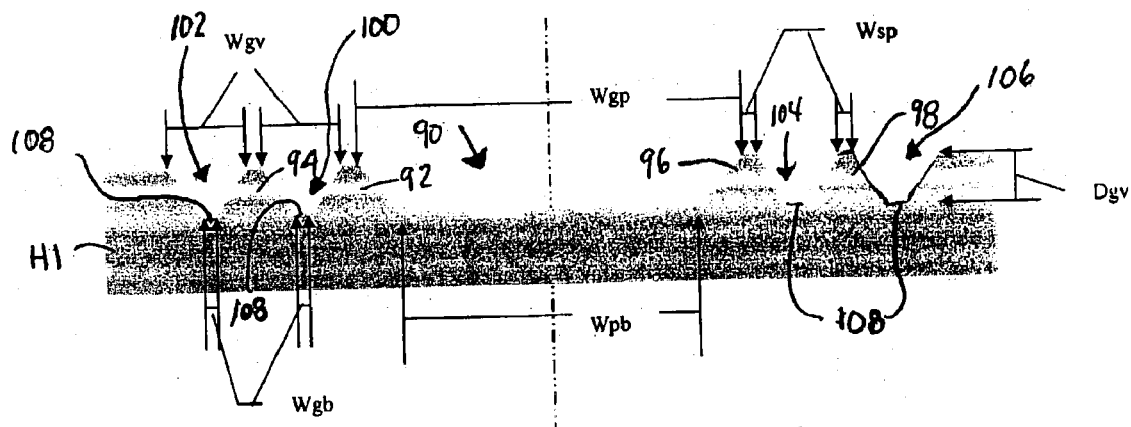
FIG. 8 is a cross-sectional view of the first cell after etching with the first mask.

Referring now to FIG. 8, a cross-sectional view along line A—A of FIG. 7 is illustrated. The partially etched cell H1 has a center portion 90, a first longitudinal rib 92, a second longitudinal rib 94, a third longitudinal rib 96, and a fourth longitudinal rib 98. A first longitudinal groove 100 is disposed between the first rib 92 and the second rib 94. A second longitudinal groove is positioned adjacent to the rib 94. A third longitudinal groove 104 is disposed between the rib 96 and 98. A fourth longitudinal groove is disposed adjacent to the rib 98. Thus, the etching of the grooves 100–106 and the center portion 90 form the ribs 92. Each groove 100–106 is preferably formed to have a flat portion 108. The grooves in the lateral direction preferably have the same dimensions. Thus, the figure of a lateral direction would have the same dimensions except the width Wgp becomes Lgs. The dimensions of the ribs and grooves are:

Wgv=25
Wgb=5
Wgp=85
Wpb=65
Wsp=5
Dgv=15.7

Figure 9:
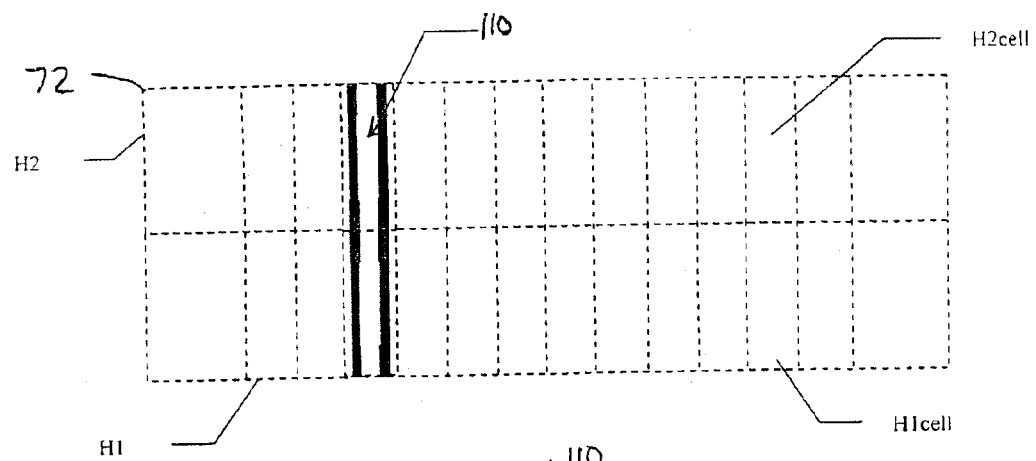
FIG. 9 is an elevational view of a second mask on the first and second cells.

Referring now to FIG. 9, a second mask 110 is illustrated. As can be seen, mask 110 extends between cells H1 and H2.

Figure 10:
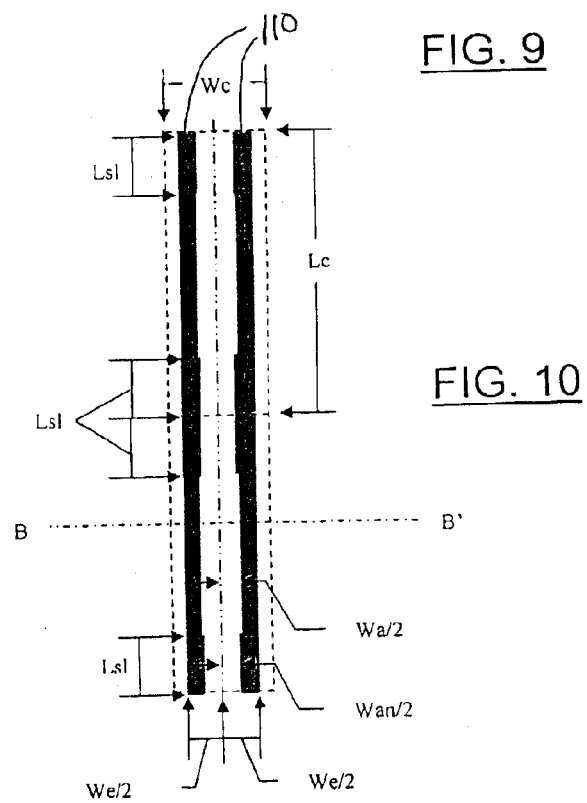
FIG. 10 is an enlarged elevational view of the mask on the first and second cells.

Referring now to FIG. 10, the mask 110 is used to form breaking lines so that the various cells may be broken apart into their corresponding housing portions. The various dimensions with respect to the mask 2 are:

Wc=1.0 mm
We=400
Lc=3.0 mm
Lsl=500
Wa=280
Wan=210

Figure 11:
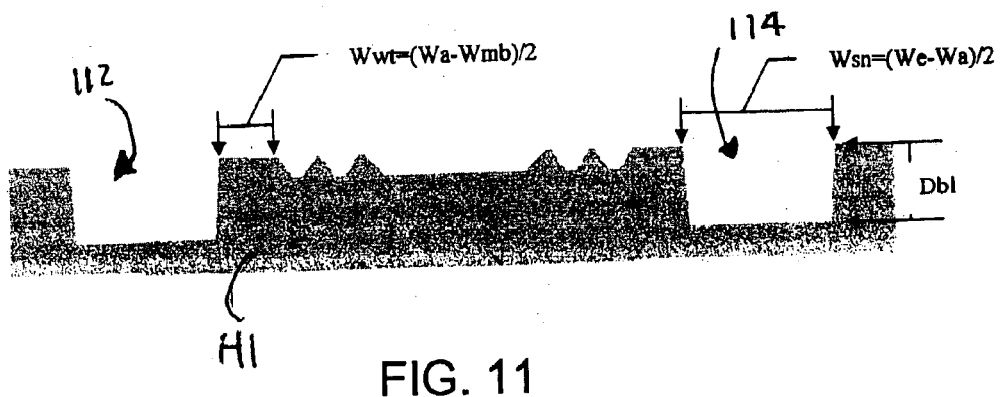
FIG. 11 is a cross-sectional view of the first cell after etching with the second mask.

Referring now to FIG. 11, cross-sectional view of cell H1 is illustrated. As can be seen, breaking lines 112 and 114 run longitudinally with respect to the cell H1. As mentioned above, the breaking lines 112 and 114 allow the top portion of housing 54 to be formed. The dimensions in the cross-sectional view are:

Wwt=(Wa−Wmb)/2=(280−205)/2=37.5
Wsn=(We−Wa)/2=(400−280)/2=60
Dbl=about 110

It should be noted that the etchings described above with respect to FIGS. 3–11 are formed on the first side (side A) of the cells (or the wafer). Later, the etching on the second sides will be illustrated. For the etching of the grooves and ribs, preferably KOH is used in the etching process. The breaking lines may be etched using a DRIE etching process. Because the edges of the etching may form sharp corners, a brief HNA etching may be used to round the corners. The entire side A after the etching process may be coated with titanium Grade 5. The thickness of the film may, for example, be 1.5 microns on the flat surfaces. The titanium Grade 5 alloy consists of (Ti—6Al—4V) since an amorphous Ti film is desired.

Figure 12:
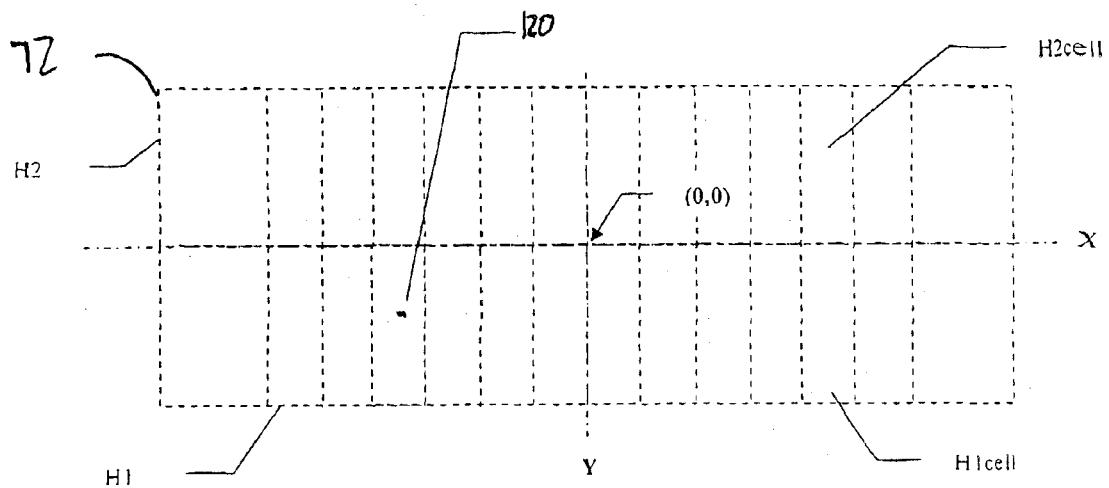
FIG. 12 is an elevational view of the chip having a third mask thereon.

Referring now to FIG. 12, a third mask 120 is illustrated on chip 72. This mask is used to determine the height of pedestal 60. Mask 120 is on the opposite side of the device as FIGS. 3–11.

Figure 13:
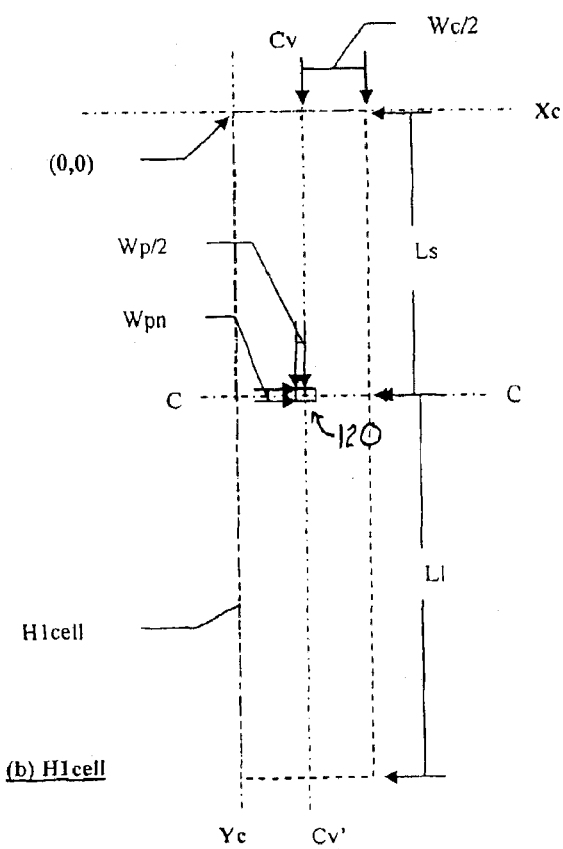
FIG. 13 is a plot of the first cell having an enlarged view of the third mask of FIG. 12.

Referring now to FIG. 13, mask 120 is shown in an enlarged scale from that of FIG. 12. The dimensions of the mask correspond to the dimensions of the end of the pedestal 60 of FIG. 2. The dimensions are:

Wc=1.0 mm

Wc/2=0.5 mm

Ls=1300

Ll=1700

Wp=65

Wpn=40

Figure 14:
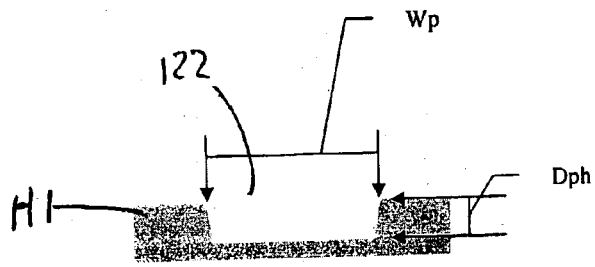
FIG. 14 is a cross-sectional view of the hole created after etching using the mask of FIG. 13.
Figure 15:
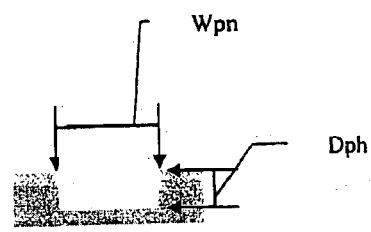
FIG. 15 is a lateral cross-sectional view of the hole created by the mask of FIG. 13.

The dimensions of the rectangular hole 122 shown in FIG. 14 and 15 are:

Wp=65

Wpn=40

Dph=50

Figure 16:
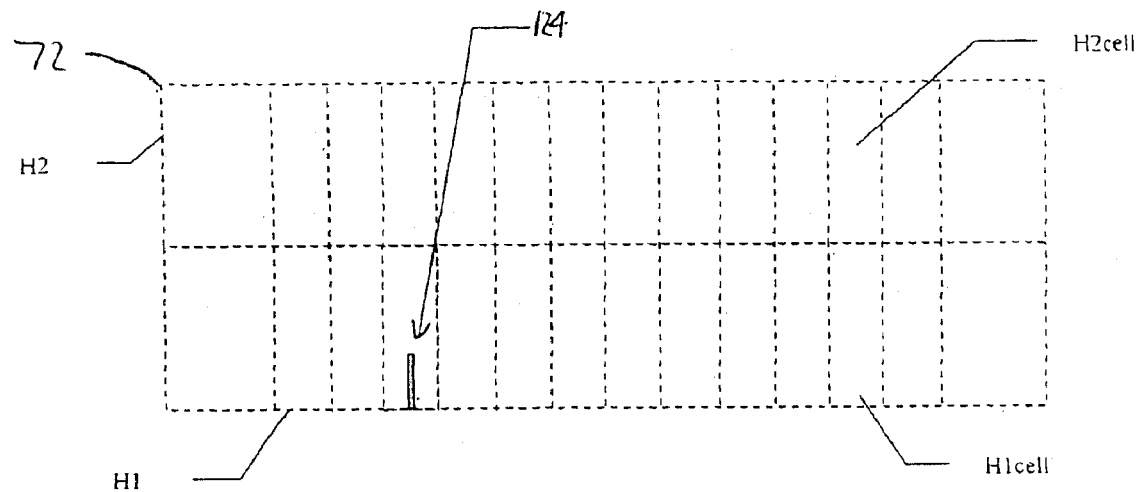
FIG. 16 is an elevational view of the chip having a fourth mask thereon.
Figure 17:
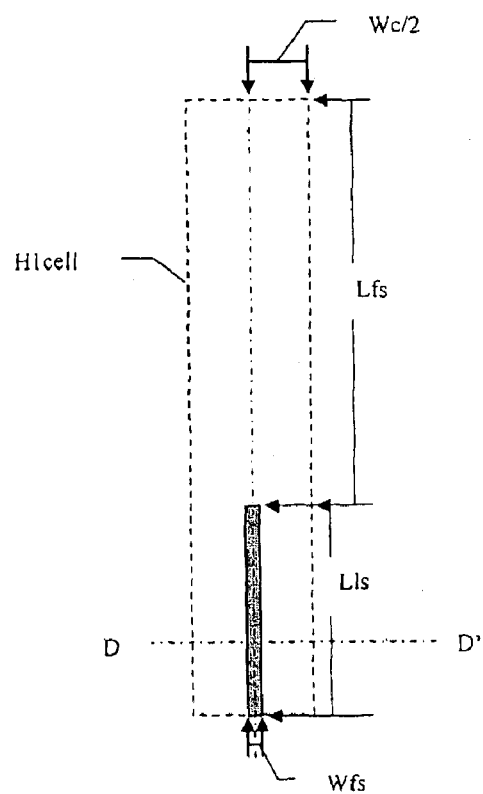
FIG. 17 is an enlarged view of the first cell having the fourth mask thereon.

Referring now to FIGS. 16 and 17, a fourth mask 124 is illustrated. Fourth mask 124 is also formed on the lower surface of the cell H1. The etching allows for the size of the optical fiber so that the optical fiber may be inserted within the top portion of housing 54. The dimensions of mask 124 are:

Lfs=1900

Lls=1100

Wfs=90

Figure 18:
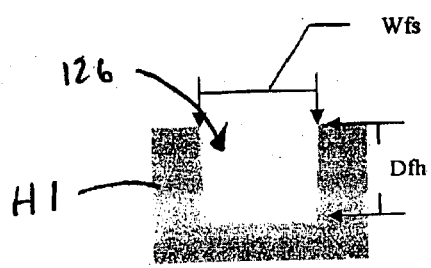
FIG. 18 is a cross-sectional view of the rectangular hole created by etching using mask four.

Referring now to FIG. 18, the cell H1 is illustrated with the rectangular slot 126 formed from mask 4. Rectangular slot 126 as mentioned above is used to receive the optical fiber during assembly. The dimensions of the rectangular slot 126 are:

Wfs=90

Dfh=90

The etching process uses a photolithography process, and DRIE etching as mentioned above.

The cell H1 is preferably planarized in a known manner before performing the fifth mask 128 described below.

Figure 19:
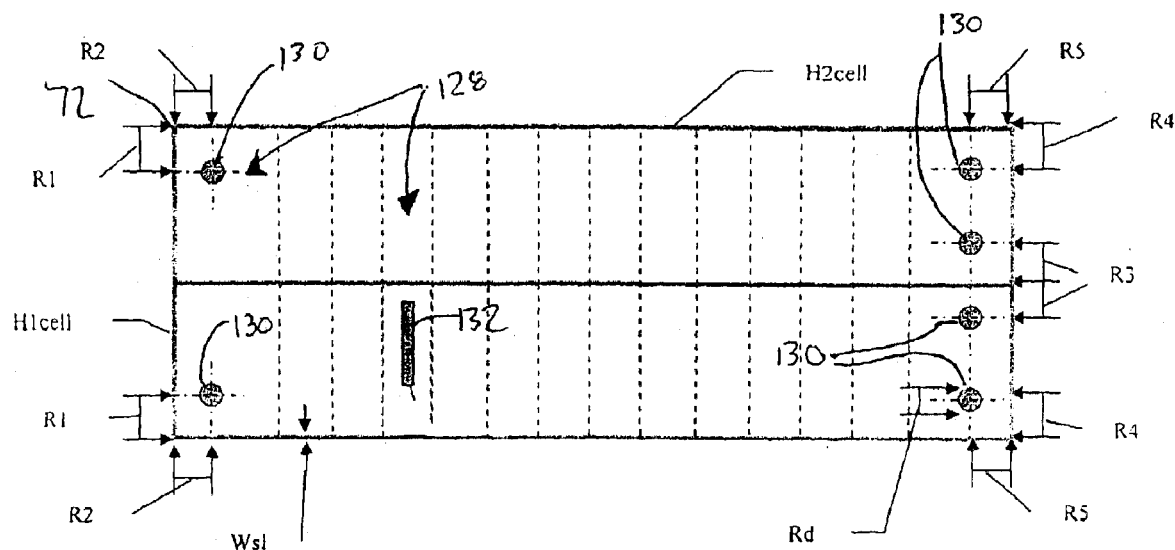
FIG. 19 is an elevational view of the chip having a fifth mask on the first cell.

Referring now to FIG. 19, the chip 72 is illustrated having a mask 128. Mask 128 has registration portions 130 and a rectangular portion 132.

Figure 20:
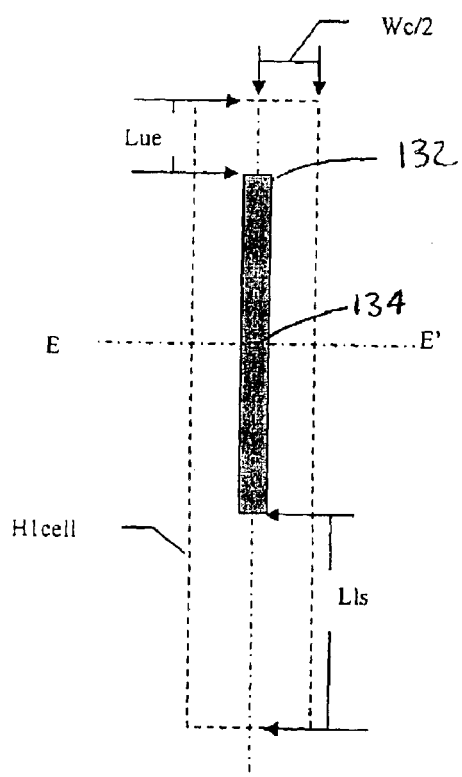
FIG. 20 is an enlarged elevational view of the first cell having the fifth mask thereon.
Figure 21:
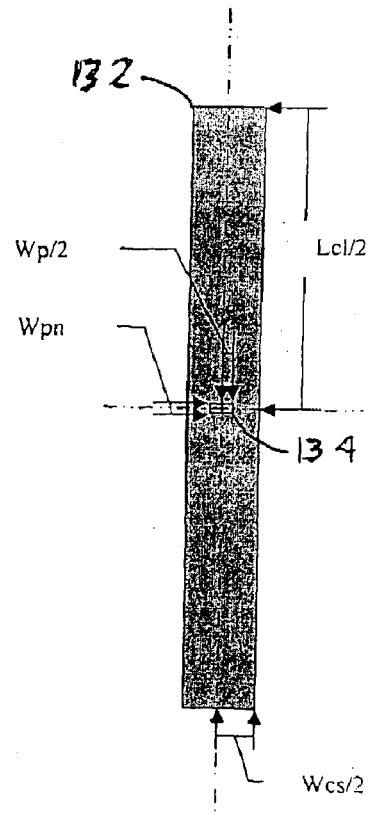
FIG. 21 is an enlarged view of the mask of FIG. 20.

Referring now to FIGS. 20 and 21, enlarged versions of the rectangular portion 132 are illustrated. The rectangular portion 132 has an opening 134 therein. The opening 134 corresponds to the pedestal so that the pedestal area is not further etched. The rectangular portion 132 is used to etch out the cavity 62 shown in FIG. 2. The dimensions of the etchings are:

R1=R2=R3=R4=R5=70

Rd=340

Wsl=15

Lue=700

Lcl=1200

Lls=1100

Wcs=205

Wp=65

Wpn=40

Figure 22:
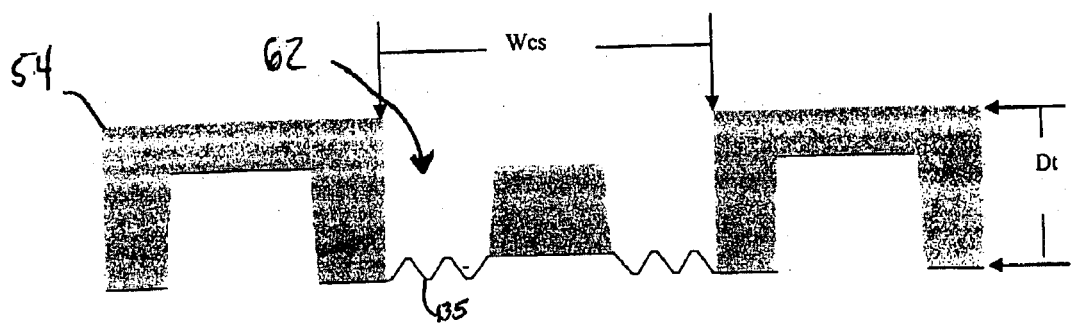
FIG. 22 is a cross-sectional view of the first cell after etching using the masks 1, 2, 3, and 5.

Referring now to FIG. 22, a cross-sectional view of the top portion 54 is illustrated. As can be seen, cavity 62 is illustrated while allowing the membrane and pedestal to remain fixedly thereto. As can be seen the titanium layer 135 remains while the silicon is etched away at the grooves. The dimensions illustrated on the cavity are:

Wcs=205

Dt=140 to the membrane.

Figure 23:
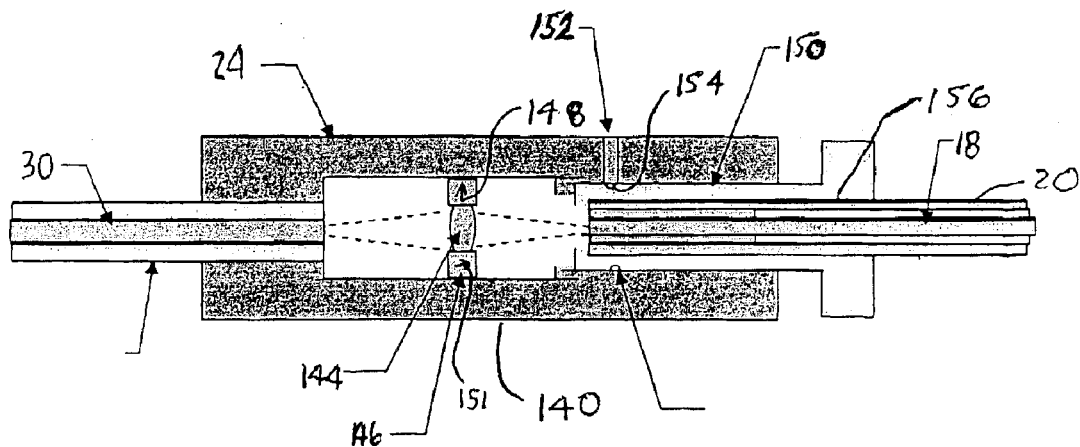
FIG. 23 is a cross-sectional view of the connector system of the present invention.

Referring now to FIG. 23, connecting system 24 is illustrated. Connecting system 24 has optical fiber 30 that is connected to fiber optic coupler 32 within the light transmitting and receiving unit 14. The second optical fiber as shown in FIG. 1 is coupled to sensor head 16. The connecting system 24 has a housing 140 that has a cavity 142 therein. Cavity 142 includes an imaging lens 144 and a lens scanning device 146. The lens scanning device 146 positions the imaging lens 144 with respect to the optical fiber 30 and the optical fiber 18. The scanning device is capable of moving the lens in a vertical direction illustrated by arrow 148. The vertical direction corresponds to the lateral axis of the housing 140 which is perpendicular to the optical axis and the longitudinal axis of the housing 140. The lens scanning device 146 is also capable of positioning the lens horizontally as indicated by arrow 151. That is, the lens scanning device 146 is capable of moving the lens 144 in a horizontal direction perpendicular to the longitudinal axis (direction 148) and optical axis of the housing 140. The optical fiber 18 may be positioned within the housing 140 using a sanitization cap 150. Sanitization cap 150 is used to prevent the system from becoming contaminated during the angioplasty procedure. The cap 150 is removable from the housing 140 and is fixedly attached to the housing using a pin 152. Pin 152 is removable and fits within a recess 154 in the cap 150. The cap 150 has a channel 156 having a diameter sized to receive the optical fiber 18 and the guidewire 20.

Figure 24:
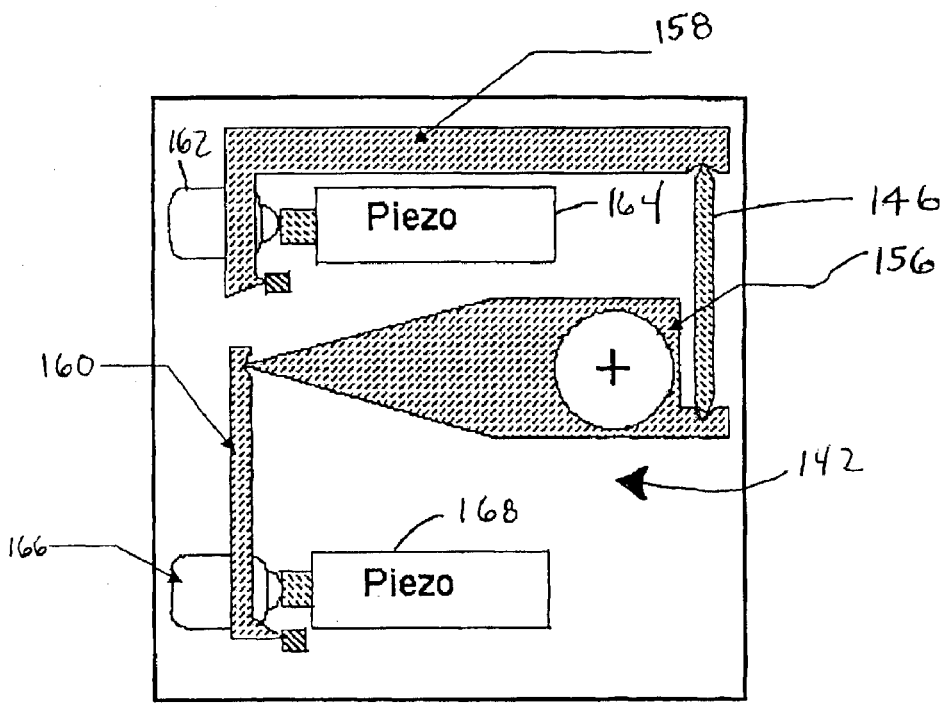
FIG. 24 is an enlarged cross-sectional view of the lens scanning device of FIG. 23.

Referring now to FIG. 24, lens scanning device 146 is illustrated in further detail. Lens scanning device 146 includes a lens holder 156 used to receive imaging lens 144 therein. Lens holder 146 has a vertical motion lever arm 158 coupled thereto. Lens holder 156 also has a horizontal motion lever arm 160 coupled thereto. Vertical motion lever arm 158 is coupled to a screw 162 which in turn is moved by piezo device 164.

The horizontal motion lever arm 160 is coupled by way of a screw 166 to a piezo device 168. Movement of the screw 166 caused by the piezo device 168 moves the lens holder 156 in a horizontal direction. Thus, the lens may be positioned in a horizontal direction and vertical direction by piezo devices 164 and 168 by pushing screws 162 and 166.

In the guidewire application, the sanitization cap end of the guidewire 120 cannot be larger than the diameter of the tube. For angioplasty procedures, a tube carrying a stent-balloon must be placed over the guidewire to place the stent in an injured part of a coronary artery. The end of the guidewire has to be removed from the fiber connector when the stent is applied. Thus, the connector has to be such that when a user of the connector disconnects or connects the guidewire to the fiber connector, the optical fiber 18 has to be reconnected in such a way that maintains consistent pressure readings. Because the connection takes place while the sensor is within the patient's artery, sensitivity or offset adjustments are not practical. The connector 24 is thus adapted by using the mechanism shown in FIG. 24. It is the desired goal of the system by monitoring the spectrometer 34 to form an image of the core of optical fiber 30 on the optical fiber 18. If this is not achieved coupling efficiency is reduced and a signal offset level may be formed. This makes the system unreliable. The lens scanning device 146 is capable of moving the lens to compensate for the offset. The piezo devices 164 and 168 are capable of a displacement of 7 microns. Because of the leverage created by the lever arms 158 and 160, up to 70 microns of movement may be achieved. Thus, an image formed by the lens may move up to 140 microns due to optical leverage. The lever arms may be formed using an electrode discharge machining process.

In operation, the purpose is to project the image of the core of the source fiber 30 on the fiber. The visibility of the fringes from the coating 50 of FIG. 2 is used for this aim. The light in the core of the guidewire goes to the end of the fiber sensor 60 when it returns the spectrum modulated by the coating 50. The light that strikes the other part of the end face of the guidewire does not contain any fringes and is reflected back to the detector 34. By moving the piezo stacks, the lever arms are moved. This movement may be controlled by the computer 42. By monitoring the visibility of the fringes, the position with the maximum visibility becomes the desired location. In a practical implementation, coarse scanning may be used followed by fine scanning. That is, the position of the system may be easily found using a 10 micron accuracy followed by 4 micron accuracy steps.

Figure 25:
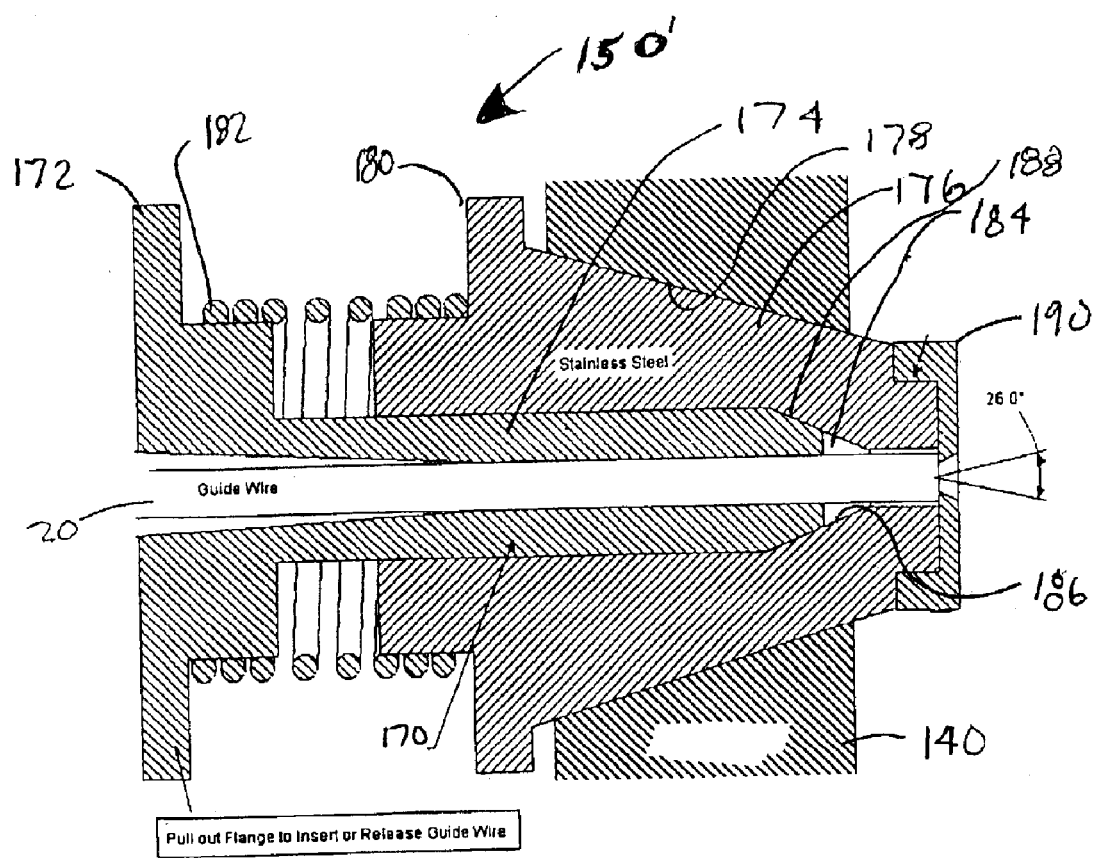
FIG. 25 is a cross-sectional view of a guidewire cap formed according to the present invention.

Referring now to FIG. 25, a second embodiment of the sanitization cap connector 150' is illustrated. In this embodiment, the connector 150' is coupled to the housing 140. The connector 150' includes a collet 170. The collet 170 has a flange portion 172 and a hollow tube portion 174. Guidewire 18 is received within the hollow tube portion 174. The connector 150' also includes a cap 176 that is positioned within an angular opening 178. The angular opening 178 corresponds to the conical shape of the cap 176. The cap 176 has a flange 180 extending therefrom. A tension spring 182 is used to couple the cap 180 to the collet 170. The spring is positioned between the flanges 172 and the flange 180 of cap portion 176. The cap is preferably formed of stainless steel. The cap 176 has a channel 184 therein. The channel 184 has a tapered surface 186 therein. The tapered surface 186 corresponds to a taped surface 188 of the collet. Thus, as the hollow tube portion 174 is inserted within the cap, the tapered surfaces 186 and 188 act to hold the guidewire 20 therein. A guidewire stop 190 may also be coupled to the cap portion 176. Guidewire stop 190 may be press fit and have a diameter smaller than the diameter of the guidewire 20. This prevents the guidewire 20 from being positioned too far within the housing 140.

The tension spring 182 pulls the collet 170 in the cap 176 which holds the guidewire 20 in place. When the guidewire 20 is released, one pulls the flange out of the collet. This releases the guidewire holding force. The cap can be released from the housing 140 by pulling it outward. This helps prevent accidental release of the guidewire 20 from the fiber connector 24.

While particular embodiments of the invention have been shown and described, numerous variations and alternate embodiments will occur to those skilled in the art. Accordingly, it is intended that the invention be limited only in terms of the appended claims.

What is claimed is:

1. An optical connecting system comprising:

a housing having a central axis;

a first optical fiber coupled to the housing having a first end;

a second optical fiber coupled to the housing along the central axis having a second end;

a lens; and a lens scanning device movably coupling the lens within the housing along the central axis, said lens scanning device moving the lens relative to the housing to direct light from the first end to the second end, said lens scanning device comprising, a lens holder coupled to the lens, a first motion arm coupled to the lens holder, first controllable means coupled to the first motion arm to generate a first motion on the lens holder though the first motion arm, a second motion arm coupled to the lens holder, and a second controllable means coupled to the second motion arm to generate a second motion on the lens holder through the second motion arm.

2. A system as recited in claim 1 wherein the first controllable means comprises a first piezo device.

3. A system as recited in claim 1 further comprising a light source, a light detector and a computer controller coupled to the first optical fiber, said computer controller coupled to the lens scanning device and the optical fiber, said computer controller adjusting a lens scanning device position until light from the light source generates maximum fringes at the detector.

4. A system as recited in claim 1 wherein the first controllable means comprises a first piezo device and a first screw, said first screw coupling the first motion arm to the first piezo device.

5. A system as recited in claim 1 wherein the first motion arm comprises a lever arm.

6. A system as recited in claim 1 wherein the lever arm is a horizontal motion arm generating horizontal motion of the lens holder.

7. A system as recited in claim 1 wherein the second controllable means comprises a second piezo device.

8. A system as recited in claim 1 wherein the second controllable means comprises a second piezo device and a second screw, said second screw coupling the second motion arm to the second piezo device.

9. A system as recited in claim 1 wherein the vertical motion arm comprises a lever arm.

10. A system as recited in claim 1 wherein the lever arm is a vertical motion arm generating vertical motion of the lens holder.

* * * * *